United States Patent
Drost

(10) Patent No.: US 6,550,746 B2
(45) Date of Patent: Apr. 22, 2003

(54) APPARATUS FOR REMOVING CARCASS IN HOG CONFINEMENT BUILDINGS

(76) Inventor: Duane A. Drost, 2033 Yew Ave., Harris, IA (US) 51345

( * ) Notice: Subject to any disclaimer, the term of this patent is extended or adjusted under 35 U.S.C. 154(b) by 0 days.

(21) Appl. No.: 09/879,716

(22) Filed: Jun. 12, 2001

(65) Prior Publication Data

US 2002/0185638 A1 Dec. 12, 2002

(51) Int. Cl.[7] ................................................. B66D 1/00
(52) U.S. Cl. ........................................ 254/332; 254/362
(58) Field of Search ............................... 254/329, 332, 254/362; 212/312, 318, 292

(56) References Cited

U.S. PATENT DOCUMENTS

| | | | |
|---|---|---|---|
| 560,145 A | 5/1896 | McGehee | |
| 1,116,272 A | 11/1914 | Haselton | |
| 1,405,079 A | 1/1922 | Vigneux et al. | |
| 1,408,645 A | 3/1922 | Schuman et al. | |
| 1,938,071 A | * 12/1933 | Hummel | 254/362 |
| 1,945,712 A | * 2/1934 | Wadd | 254/362 |
| 1,952,238 A | * 3/1934 | Dice | 254/329 |
| 2,247,795 A | * 7/1941 | Whitcomb et al. | 254/362 |
| 2,335,568 A | * 11/1943 | Lock | 254/362 |
| 2,801,760 A | * 8/1957 | Christofferson | 254/362 |
| 2,882,551 A | 4/1959 | Reich | |
| 3,244,293 A | * 4/1966 | Stahmer | 254/362 |
| 3,703,745 A | 11/1972 | Edwards | |
| 4,011,820 A | 3/1977 | Bordenave et al. | |
| 5,492,236 A | * 2/1996 | Foy | 212/318 |
| D372,982 S | 8/1996 | Williams | |

* cited by examiner

Primary Examiner—Kathy Matecki
Assistant Examiner—Sang Kim

(57) ABSTRACT

The invention is a system for removing dead animals from a building having a ceiling structure, a plurality of parallel elongated pens, and a dead animal depository station. The system includes a track that extends horizontally over the pens and is suspended from the ceiling structure. A carriage assembly is mounted on the track for travel along the track. Rotatably secured to the carriage assembly about a vertical axis is a winch apparatus that extends downwardly from the carriage. Secured to the winch is a flexible means that moves vertically with respect to the winch which is attached to dead animals for raising the animal above the pen and lowering the animal to the dead animal depository.

3 Claims, 5 Drawing Sheets

APPARATUS FOR REMOVING CARCASS IN HOG CONFINEMENT BUILDINGS

BACKGROUND OF THE INVENTION

This invention is directed toward an apparatus for lifting and transporting dead animals and more particularly an apparatus for removing a carcass in a hog confinement building.

Removing an animal carcass from a building presents many problems. Because of the size and weight of some animals, manually removing the carcass is difficult if not impossible. Further, because of the long and narrow structure of many hog confinement buildings it is difficult to maneuver a transporting device into the pen for removal of the carcass. Also, other live animals in the pen may interfere and need to be removed prior to removing the carcass with the transporting device. Therefore, a need exists for a simple system to transport a carcass to a depository station that is capable of lifting heavy animals without interfering with other animals in the pen.

Thus an objective of the invention is to provide an apparatus for removing a carcass that is simple to manufacture and simple to operate.

Another objective of the invention is to provide an apparatus for removing a carcass that is capable of lifting and moving heavy animals.

BRIEF SUMMARY OF THE INVENTION

The invention is a system for removing dead animals from a building having a ceiling structure, a plurality of parallel elongated pens, and a dead animal depository station. The system includes a track that extends horizontally over the pens and is suspended from the ceiling structure. A carriage assembly is mounted on the track for travel along the track. Rotatably secured to the carriage assembly about a vertical axis is a winch apparatus that extends downwardly from the carriage. Secured to the winch is a flexible means that moves vertically with respect to the winch which is attached to dead animals for raising the animal above the pen and lowering the animal to the dead animal depository.

DETAILED DESCRIPTION OF THE INVENTION

Figure 1:
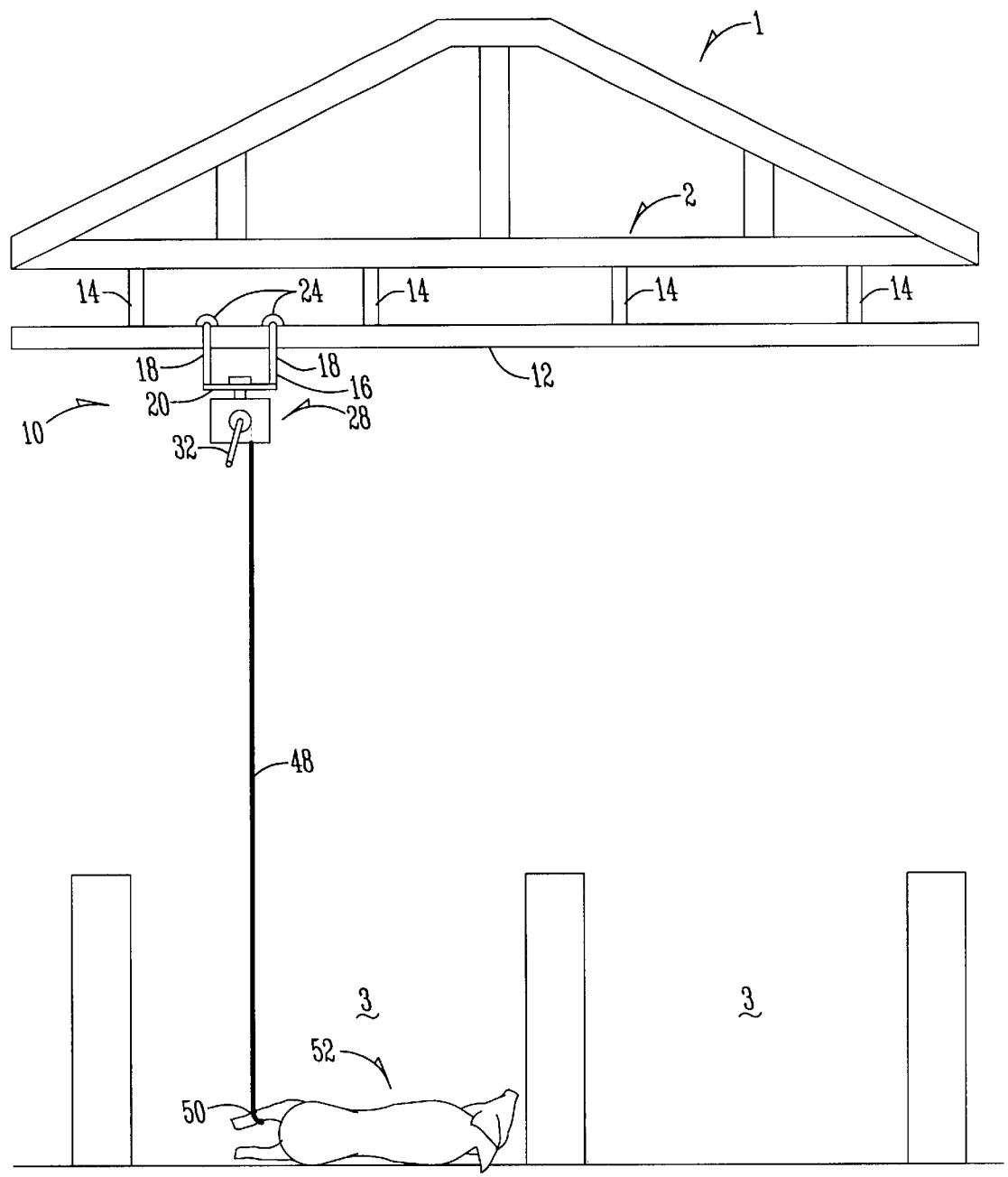
FIG. 1 is a side view of the invention in a hog confinement building.

Referring to the drawings, the system of the invention is referred to generally by reference numeral 10. While this description refers to the removal of hogs from a confinement building, the system 10 can be used in any type of building for removing any type of animal. In this example, as shown in FIG. 1, the system 10 is used in a confinement building 1 having a ceiling structure 2, a plurality of parallel elongated pens 3, and a dead animal depository station (not shown). The depository station can be an area of building 1 that is cleared for temporary storage of the carcass, an empty pen, or a vehicle for transporting the carcass to another location.

Figure 2:
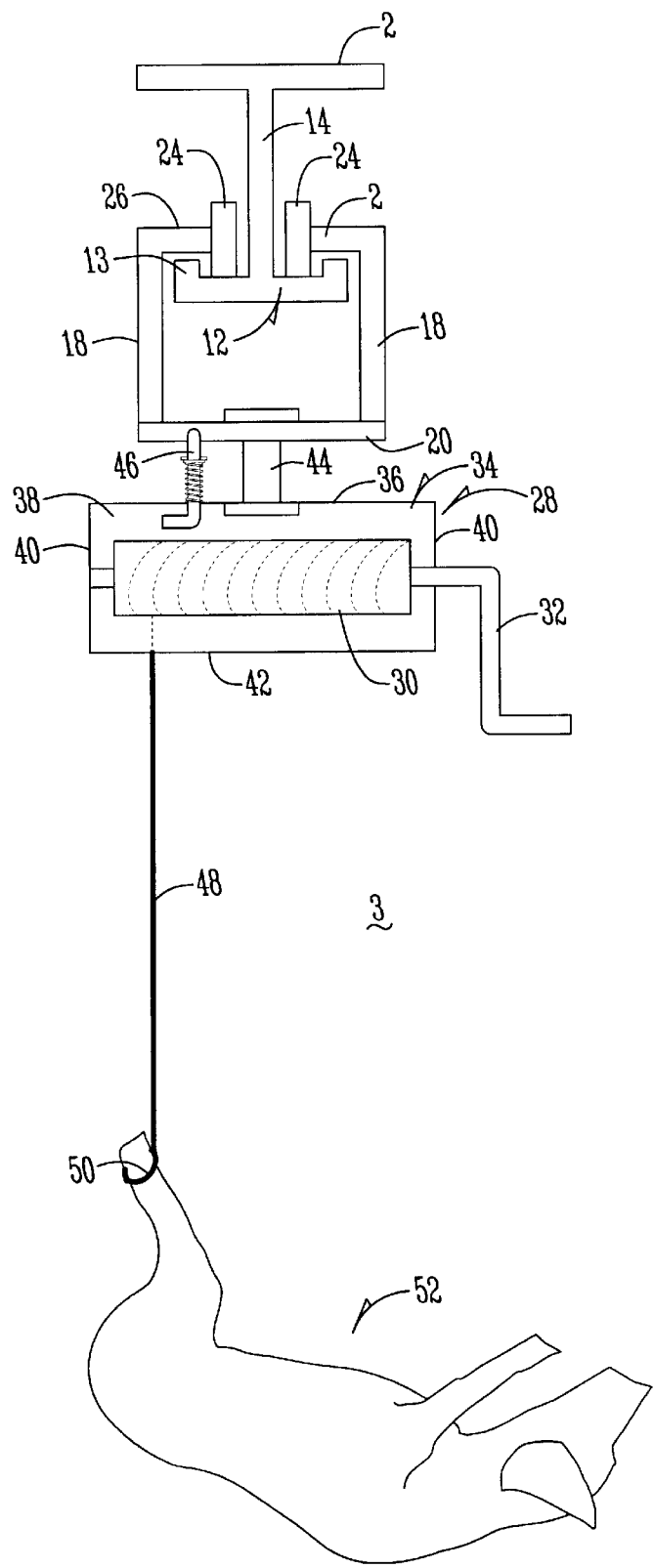
FIG. 2 is a front view of the invention.
Figure 3:
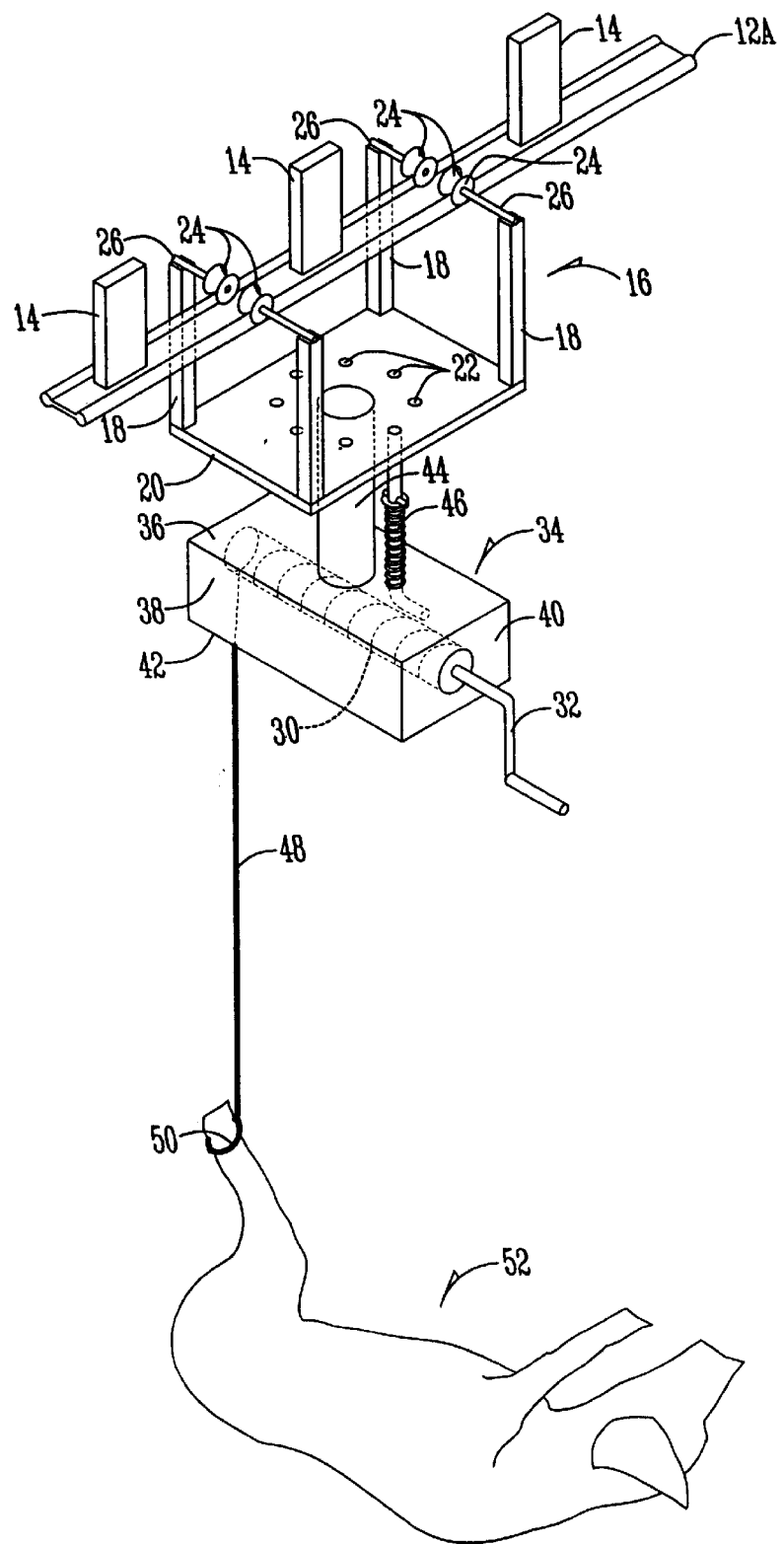
FIG. 3 is a perspective view of the invention.
Figure 4:
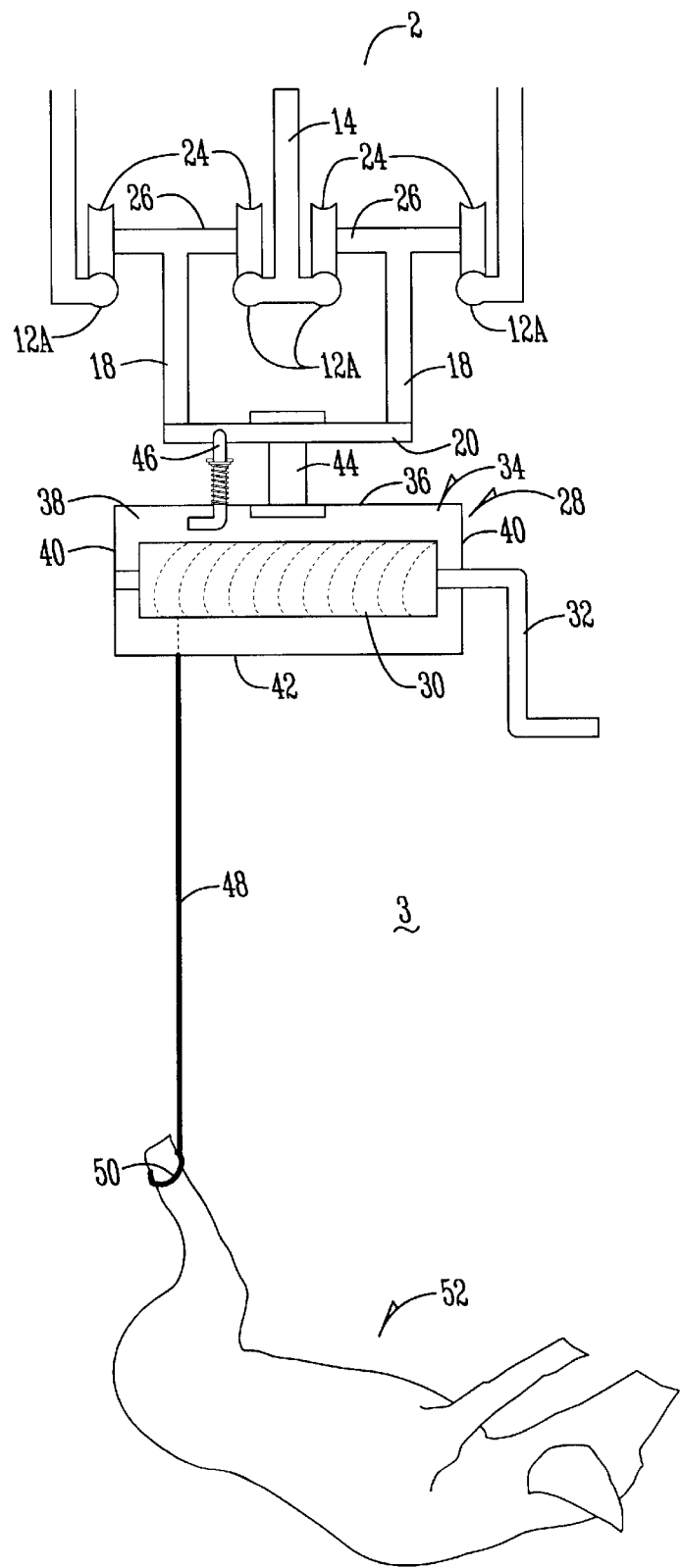
FIG. 4 is a front view of an alternative embodiment of the invention.
Figure 5:
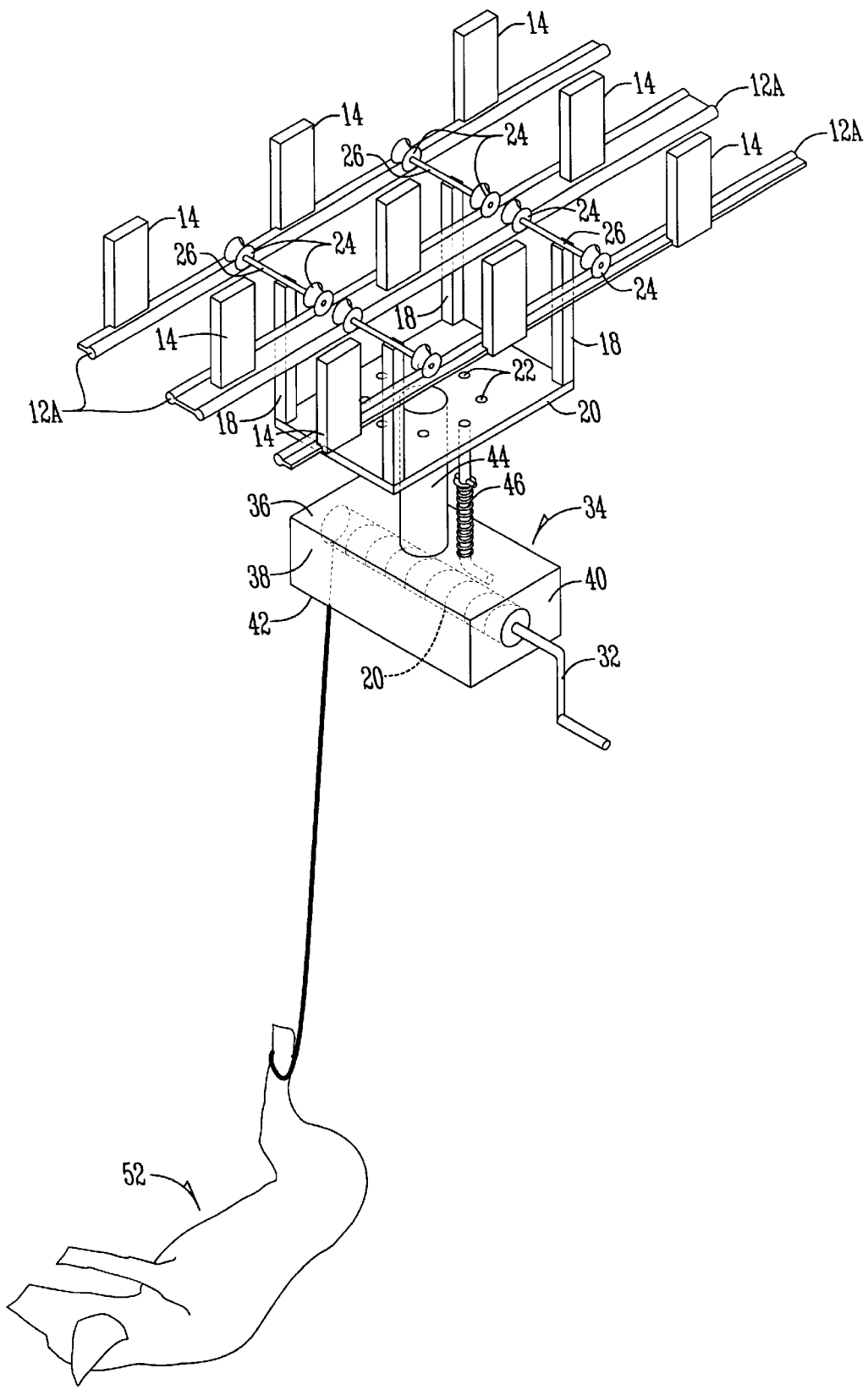
FIG. 5 is a perspective view of the alternative embodiment of the invention shown in FIG. 4.

The system 10 for removing dead animals includes an elongated overhead horizontal track 12 that is suspended from the ceiling structure 2 and extends in a transverse direction over the pen 3. As shown in FIGS. 2 and 3, the track 12 is a single C-shaped member with ends 13 that extend vertically. FIGS. 4 and 5 show an alternative embodiment where the track has three horizontal members that are suspended from the ceiling structure. In this embodiment the track 12A is cylindrical in shape. The track is suspended from the ceiling by vertical members 14 connected to the ceiling structure 2.

With reference to FIGS. 2 and 3, moveably mounted on the track 12 is a carriage 16 for travel along the track 12. The carriage 16 has a pair of side members 18 (FIG. 2) that extend downwardly from the track 12 and are connected by a plate 20 that extends between the side members 18. The plate 20 has a plurality of holes 22 (FIG. 3) that extend through the plate 20 and are positioned radially around the center of the plate. A pair of wheels 24 with outwardly extending axles 26 are connected to the side members 18. The wheels, as shown in FIGS. 2 and 3 are fitted on the track 12 for movement thereon. In an alternative embodiment, shown in FIGS. 4 and 5, four pairs of wheels 24 have axles 26 that extend between each of the pair of wheels. Two sets of wheels 24 are positioned in spaced relation on the same horizontal track members and the other two sets of wheels 24 are positioned in spaced relation on the other horizontal track members. The side members 14 are connected to the axles 26 of the respective sets of wheels 24 for movement on the tracks 12A.

Rotatably secured to the carriage assembly 16 about a vertical axis is a winch apparatus 28 (FIGS. 2 and 3). The winch extends downwardly from the carriage assembly 16 and includes a rotatable crank shaft 30 and handle 32. The crank shaft 30 is enclosed in a housing 34 having a top 36, sides 38, ends 40, and a bottom 42. The winch can be manually or electrically operated by a power source (not shown). A rotatable swivel 44 extends from the carriage assembly 16 to the winch apparatus 28 and allows the winch apparatus 28 to rotate in relation to the carriage assembly 16 about a vertical axis on bearings (not shown). A spring loaded pin 46 extends upwardly from the top 36 of the winch 28 for movement in and out of the holes 22 of the carriage plate 20. The spring loaded pin 46 locks the winch 28 in a position in relation to the carriage assembly. The ability to rotate the winch 28 in relation to the carriage assembly 16 and lock the winch 28 in position with the pin 46 allows for positioning the optimum angles for use.

Secured to the winch is a cable 48 with a loop 50 on one end. The cable 48, which extends through an opening in the bottom 42 of the winch 28 can be retracted and wrapped around the crank shaft 30 when the handle 32 is rotated. The cable 48 is released and extended through an opening in the bottom 42 when the handle is rotated in the opposite direction. The loop 50 on the end of the cable 48 is for attaching the cable to the dead animal 52 for removal.

In use, the carriage assembly 16 is moved on the track 12 to a position near the animal 52. The pin 46 is retracted out of one of the holes 22 of the plate 20 and the winch 28 is rotated about the swivel 44 such that the cable 48 will extend is substantially a straight line toward the animal 52. When the winch 28 is positioned at an optimum angle the pin 46 is released into one of the holes 22 of the plate 20 locking the winch 28 into position in relation to the carriage assembly 16. Once in position, the handle 32 is rotated in a direction releasing the cable 48 from the crank shaft 30. Once the cable 48 has reached the animal 52, the loop 50 is attached to the animal. When attached, the handle 32 is rotated in a direction where the cable 48 is retracted around the crank shaft 30 raising the animal 52 to a level above the pens 3. Then the carriage assembly 16 is moved on the track 12 to a position above the depository station where the handle 32 is rotated in a direction releasing the cable 48 from the crank shaft 30 and lowering the animal 52 onto or into the depository station.

The winch 28 of the embodiment of FIGS. 4 and 5 is identical to the winch 28 of FIGS. 2 and 3.

As can be seen from this disclosure, the objects of this invention have been met. Having thus described the invention it should be understood that numerous structural modifications and adaptations may be resorted to without departing from the spirit of the invention.

What is claimed is:

1. A system for removing dead animals from a confinement building having a ceiling structure, a plurality of parallel elongated pens, and a dead animal depository station, comprising:

an elongated overhead horizontal track suspended from the ceiling structure and extending in a transverse direction over the pens;

a carriage assembly moveably mounted on the track for travel along the track;

a winch apparatus rotatably secured to the carriage assembly about a vertical axis and extending downwardly from the carriage assembly;

a flexible means secured to the winch for vertical movement with respect to the winch for being lowered into a pen for attachment to the dead animal and for raising the dead animal above the level of pens for permitting the movement of the dead animal upwardly from one of the pens and thence along the track system over the pens for lowering to the dead animal depository station; and a means for selectively locking the winch in a position with respect to the carriage assembly.

2. A system for removing dead animals from a confinement building having a ceiling structure, a plurality of parallel elongated pens, and a dead animal depository station, comprising:

a plurality of elongated overhead track members suspended from the ceiling structure and extending in a transverse direction over the pens;

a carriage assembly moveably mounted on the track system for travel along the track system;

a winch apparatus rotatably secured to the carriage assembly about a vertical axis and extending downwardly from the carriage assembly;

a flexible means secured to the winch for vertical movement with respect to the winch for being lowered into a pen for attachment to the dead animal and for raising the dead animal above the level of pens for permitting the movement of the dead animal upwardly from one of the pens and thence along the track over the pens for lowering to the dead animal depository station; and a means for selectively locking the winch in a position with respect to the carriage assembly.

3. A system for removing dead animals from a confinement building having a ceiling structure, a plurality of parallel elongated pens, and a dead animal depository station, comprising:

an elongated overhead horizontal track suspended from the ceiling structure and extending in a transverse direction over the pens;

a carriage assembly moveably mounted on the track for travel along the track;

a winch apparatus rotatably secured to the carriage assembly about a vertical axis and extending downwardly from the carriage assembly;

a flexible means secured to the winch for vertical movement with respect to the winch for being lowered into a pen for attachment to the dead animal and for raising the dead animal above the level of pens for permitting the movement of the dead animal upwardly from one of the pens and thence along the track system over the pens for lowering to the dead animal depository station; and a locking pin that engages both the winch and the carriage assembly to selectively lock the winch in a position with respect to the carriage assembly.

* * * * *